United States Patent [19]

Hazenbroek et al.

[11] Patent Number: 4,769,872
[45] Date of Patent: Sep. 13, 1988

[54] POULTRY CARCASS AND WINGS PROCESSOR

[76] Inventors: Jacobus E. Hazenbroek, Burg. de Zeeuwstraat 52; Bastiaan Verrijp, Burg. de Zeeuwstraat 103, both of Numansdorp, Netherlands

[21] Appl. No.: 74,717

[22] Filed: Jul. 17, 1987

[51] Int. Cl.⁴ .............................................. A22C 21/00
[52] U.S. Cl. ............................................ 17/52; 17/11
[58] Field of Search ............................................. 17/11

[56] References Cited

U.S. PATENT DOCUMENTS

| | | | |
|---|---|---|---|
| 4,207,653 | 6/1980 | Gasbarro | 17/11 |
| 4,503,587 | 3/1985 | Martin | 17/11 |
| 4,536,919 | 8/1985 | Cashwell et al. | 17/11 |
| 4,577,368 | 3/1986 | Hazenbroek | 17/11 |

FOREIGN PATENT DOCUMENTS 8400162  8/1985  Netherlands ............................. 17/11

Primary Examiner—Willie G. Abercombie
Attorney, Agent, or Firm—Thomas & Kennedy

[57] ABSTRACT

Birds 24 are placed on bird support mandrels 22 and their wings are spread into the recesses 68 at the peripheral portion of the rotary carrier wheel 11. As the wheel 11 rotates, the wings are severed from the carcasses by the wing cutters 12 and 13, the carcasses transferred to the carcass carrier 14, where the breasts are split longitudinally by the breast cutter 42 and the backbones of the carcasses are cut out by the backbone cutters 49 and 50. In the meantime, the previously cut-away wings continue to move with the rotary carrier wheel 11 where they are guided and cut apart at their joints by blade members 90–92.

5 Claims, 3 Drawing Sheets

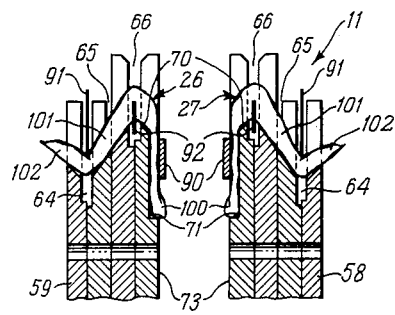
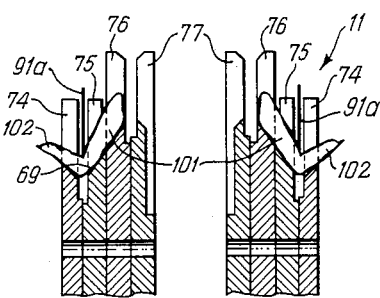
FIG. 6  FIG. 7
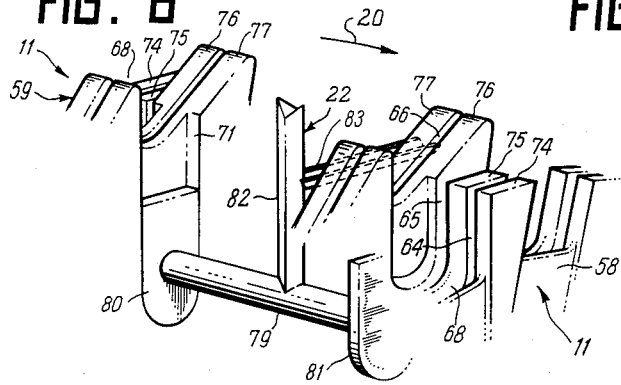
FIG. 8
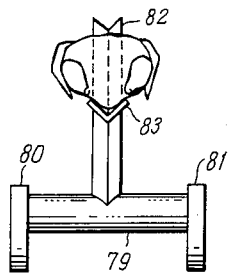
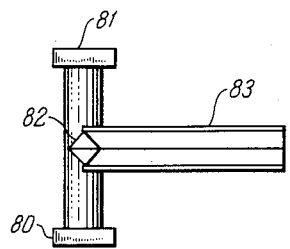
FIG. 9  FIG. 10
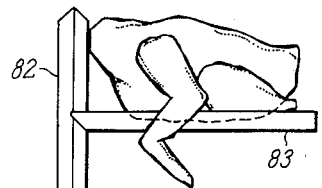
FIG. 11

POULTRY CARCASS AND WINGS PROCESSOR

TECHNICAL FIELD

This invention relates to the processing of previously eviscerated poultry carcasses, with the wings still attached to the carcasses, whereby the carcasses are moved in series through an automated processing system, the wings are removed from the carcasses and cut at the joints, and the carcasses are cut longitudinally through the breast and along the backbone to divide the carcasses in halves.

BACKGROUND OF THE INVENTION

In the past, various machines have been developed for automatically processing poultry, including the steps of cutting the poultry in segments, so that the portions of the wings, legs and carcasses could be sold separately. For example, U.S. Pat. Nos. 4,373,232, 4,424,608 and 4,536,919 disclose poultry processing equipment whereby the wings of the carcass are removed and the carcasses split through the breast and along the backbone in an automated process.

When the wings of poultry carcasses are removed from the carcasses, sometimes the wings are to be cut up at their joints and sold as individual parts. Recently, wing cutup machines have been developed for this purpose, whereby the poultry wings are placed in the peripheral portion of a rotary carrier wheel, and as the wings move with the wheel, the joints are cut by knives that register with peripheral grooves in the wheel, thereby cutting apart the segments of the wings at the joints. This concept is disclosed in U.S. Pat. No. 4,577,368.

The step of placing the poultry wings in separate equipment after the wings have been severed from the carcass so that the wings can be cut apart requires a separate operator, with each wing being individually handled by the operator as it is being placed in the cutup machine.

SUMMARY OF THE INVENTION

Briefly described, the present invention comprises a poultry carcass and wings processor which automatically functions to remove the wings from poultry carcasses, cut both wings apart into segments at the joints of the wings, longitudinally split the breast of the carcass and remove the backbone from the carcass, so as the divide the carcass into halves.

The operator places the poultry carcass on a mandrel supported in a circumferential slot of a rotary carcass carrier wheel and spreads the wings laterally away from the carcass and places the wings in recesses at each side of the wheel. As the wheel rotates, cutting blades sever the wings from the carcass at the joint that connects the wings to the carcass, so that the wings continue to move with the wheel after being separated from the carcass. As the wings continue to move with the wheel, the wings are cut at their joints so as to sever each wing in three parts. In the meantime, the carcass is transferred from the wheel to a rectilinear rail, by mounting the previously eviscerated cavity of the carcass about the rail and urging the carcass along the rail with a conveyor. As the carcass moves along the rail, it is engaged by a cutter positioned below the rail so as to split the breast in halves, and the carcass is also engaged by a cutter positioned above the rail which removes the backbone from the carcass. This leaves the carcass in two halves.

Thus, it is an object of this invention to provide an automated poultry carcass and wings processor which functions to expediently remove the wings from carcasses, divide the wings in segments, and cut the carcasses in halves.

Another object of this invention is to provide an improved poultry processor which functions to remove both wings from a carcass and cut the wings into segments in a continuing operation.

Another object of this invention is to provide an improved poultry processing apparatus which is of relatively simple design, inexpensive to produce and to operate, and which reliably functions to remove the wings from poultry carcasses, divide the wings into segments, and to cut the carcasses.

Other objects, features and advantages of this invention will become apparent upon reading the following specification, when taken in conjunction with the accompanying drawings.

BRIEF DESCRIPTION OF THE DRAWINGS

FIG. 6 is a cross sectional view, similar to FIG. 4, but showing the wings of a bird that has been separated from the carcass and how the first joint is cut in each wing.

FIG. 7 is a cross sectional view of the rotary carrier wheel, similar to FIG. 6, but showing how the second joints of the wings are cut apart.

FIG. 8 is a perspective illustration of one of the bird support mandrels and the adjacent wheel elements.

FIG. 9 is a front view of a bird support mandrel.

FIG. 10 is a top view of a bird support mandrel.

FIG. 11 is a side view of the bird support mandrel.

DETAILED DESCRIPTION

Figure 1:
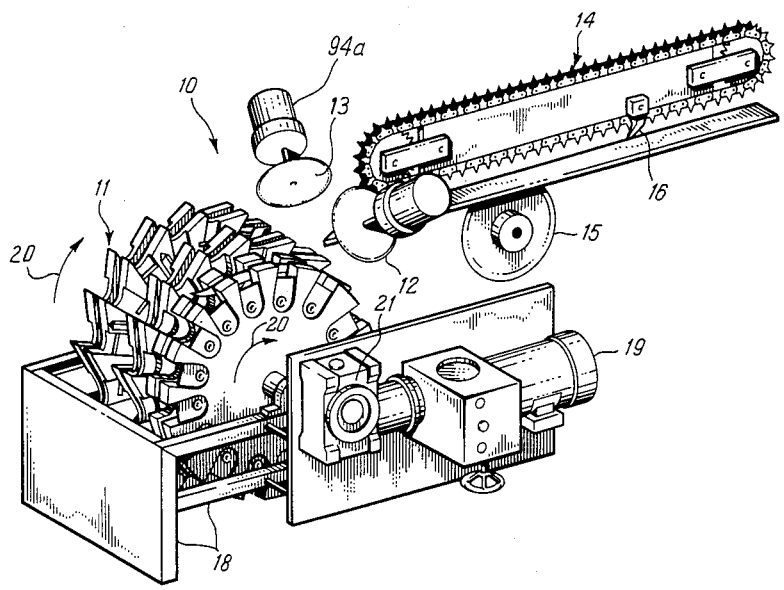
FIG. 1 is a perspective illustration of the poultry carcass and wings processor.

Referring now in more detail to the drawings, in which like numerals indicate like parts throughout the several views, FIG. 1 illustrates the poultry carcass and wings processor 10 which includes a rotary carrier wheel 11, wing cutters 12 and 13, carcass carrier 14, breast cutter 15 and back cutter 16. The assembly is mounted on a framework 18. Motor 19 drives rotary carrier wheel 11 in the direction as indicated by arrow 20, through variable speed transmission 21.

Figure 2:
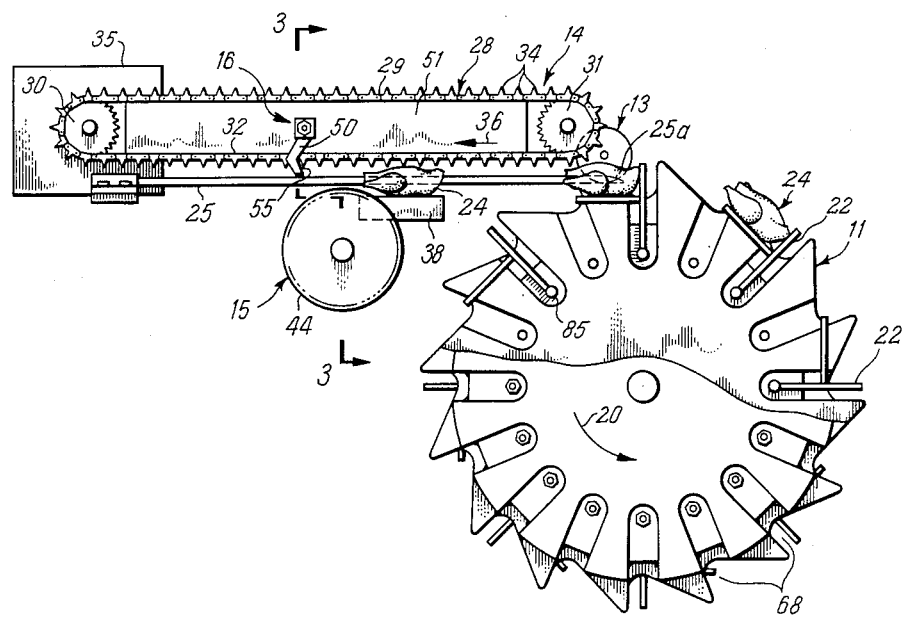
FIG. 2 is a side elevational view of the poultry carcass and wings processor, showing most of the operative elements of the processor, with the upper portion of the rotary carrier wheel being broken away to show the mandrels upon which the birds are mounted.

As illustrated in FIG. 2, bird support mandrels 22 are mounted in the rotary carrier wheel 11 at spaced intervals about the carrier wheel and birds 24 are mounted on a mandrel by an operator (not shown) and the wings spread laterally from the bird and supported by the rotary carrier wheel. The birds are carried by the rotary carrier wheel to the carcass carrier 14 with the breast of the bird facing downwardly and the tail opening of the previously eviscerated visceral cavity facing in the direction of movement of the wheel.

As each bird moves to and beyond the upper portion of the rotary carrier wheel 11, the wings are removed from both sides of the carcass by wing cutters 12 and 13, and the tail opening of the previously eviscerated visceral cavity of the bird is mounted on the rectilinear rail 25 of the carcass carrier 14. Thus, each carcass 24 is picked from the rotary carrier wheel 11 by the insertion of the rail 25 into the visceral cavity of each bird.

As best illustrated in FIG. 2, the carcass carrier 14 includes chain conveyor 28 that includes endless conveyor chain 29 mounted about sprockets 30 and 31. The lower flight 32 of the conveyor chain runs parallel to an in closely spaced relationship with respect to rail 25. Outwardly directed teeth 34 of conveyor chain 29 engage the back portion of each carcass 24 so as to positively move each carcass along rail 25. Sprocket 30 of chain conveyor 28 is driven by a motor (not shown) in housing 35 in the direction indicated by arrow 36.

Rail 25 is V-shaped in cross section (FIG. 3), and the birds 22 are mounted on the rail 25 by inserting the opening of the previously eviscerated visceral cavity 36 onto the pointed end portion 25a of the rail 25 and urging the bird further onto the rail as the rotary carrier wheel continues to rotate, until the chain conveyor 28 engages the back portion of the bird with its teeth 34, whereupon the conveyor continues the movement of each bird along the rail. The V-shaped cross sectional configuration of the rail 25 is compatible with the shape of the backbone of the carcass 22, in that the backbone protrudes slightly into the previously eviscerated cavity of the bird, so that the backbone tends to nest in the V-shape of the rail and stabilize the carcass as it moves along the rail. Further guide elements such as guide plates 38 and 39 and guide bars 40 and 41 are used to stabilize the bird as it moves further along the rail, toward breast cutter 42.

Breast cutter 15 comprises a rotary disc cutter 44 and its motor 45, with the motor being mounted in a housing 46. Disc cutter 44 is mounted on a horizontal axle or drive shaft 48 so that it operated in a vertical plane which is aligned with the guide rail 25. Thus, when the carcasses 24 are guided into engagement with the disc cutter 44, they are cut by the disc cutter longitudinally, along the breast bone and parallel to the backbone of the bird, so that the breast is split longitudinally by the cutting action of the disc cutter 44.

Figure 3:
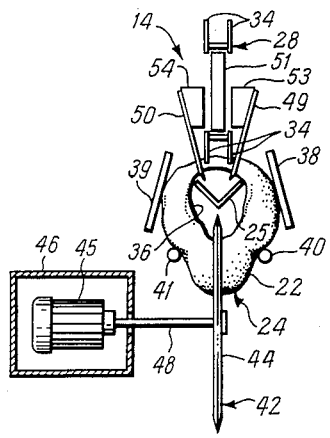
FIG. 3 is an end view of the carcass carrier, taken along lines 3—3 of FIG. 2.

As best illustrated in FIGS. 2 and 3, backbone cutter 16 comprises a pair of cutters 49 and 50 mounted to the chain guide plate 51 of chain conveyor 28 by means of mounting blocks 53 and 54. The backbone cutters 49 and 50 are angled downwardly and inwardly from the chain guide plate 51 so as to reach downwardly and inwardly beyond the lower flight 32 of the chain conveyor 28, and reach into the V-shaped rail 25. The sharpened lower end portions 55 (FIG. 2) of each backbone cutter 49 and 50 are positioned so as to straddle the backbone of the carcass of the birds as the birds are moved along the guide rail 25, which results in the backbones of the birds being cut away from the carcasses.

After the carcasses have been cut by the breast cutter 15 and backbone cutter 16, the carcasses are split in half longitudinally.

Figure 4:
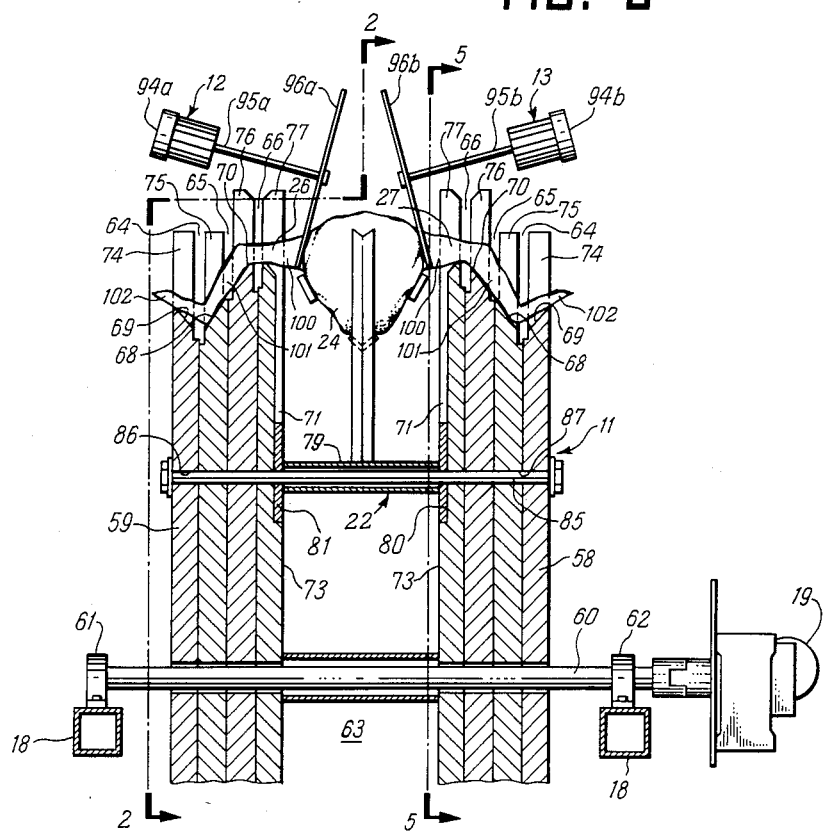
FIG. 4 is a cross sectional view of a portion of the rotary carrier wheel, showing how the birds are mounted on a mandrel and carried to the first cutting blades.

As illustrated in FIG. 4, the rotary carrier wheel 11 comprises a pair of similar, mirror image wheel halves 58 and 59 which are mounted on a common drive axle 60, with the drive axle being mounted in bearings 61 and 62 that are supported on the frame work 18. The wheel halves are parallel to and spaced from each other so as to form a centrally positioned peripheral slot or groove 63 therebetween. Motor 19 is coupled with drive axle 60 and rotates the carrier wheel in the direction indicated by arrow 20, so that the upper peripherial portion of the carrier wheel moves toward the carcass carrier 14.

As illustrated in FIG. 4, each wheel halves 58 and 59 include three circumferential annular grooves 64, 65 and 66, and a series of equally spaced wing receiving recesses or troughs 68 spaced circumferentially about each wheel half. Each recess 68 includes a V-shaped slot 69 adjacent the outer surfaces of each wheel half, and an apex 70 adjacent the inner surface of each wheel half, and an inwardly facing slot 71 in the inner surfaces 73 of each wheel half. As illustrated in FIGS. 7 and 8, each recess 68 is bounded by radially extending protrusions 74, 75, 76 and 77, with the protrusions being axially aligned with one another in each wheel half, and with the protrusions of each wheel half being axially aligned with the protrusions of the other wheel half.

As illustrated in FIGS. 8-11, the bird support mandrels 22 are located between the wheel halves 58 and 59 in the centrally positioned groove 63 and each mandrel comprises a horizontal support tube 79, a pair of mounting blocks 80 and 81 mounted parallel to one another to the ends of the horizontal support tube, neck support stem 82 mounted at one of it sends to an extending at a right angle from the intermediate portion of the horizontal support tube 79, and breast support stem 83 which is mounted at one of its ends to an intermediate portion of the neck support stem and which extends at a right angle from neck support stem 82. The breast support stem is V-shaped. The mounting blocks 80 and 81 are spaced apart a distance sufficient to fit snuggly into the inwardly facing slots 71 of each wheel half 58 and 59. A connecting rod 85 (FIG. 4) passes through aligned openings 86 and 87 of each wheel half and through openings (not shown) of each mounting block 80 and 81, and through the horizontal support tube 79 of each bird support mandrel 22, so as to firmly anchor the mandrels in place. When mounted in place, the neck support stem 82 of each mandrel extends radially outwardly from the drive axle 60 of the rotary carrier wheel 11, and each breast support stem 83 extends in the direction of rotation of the rotary carrier wheel.

Figure 5:
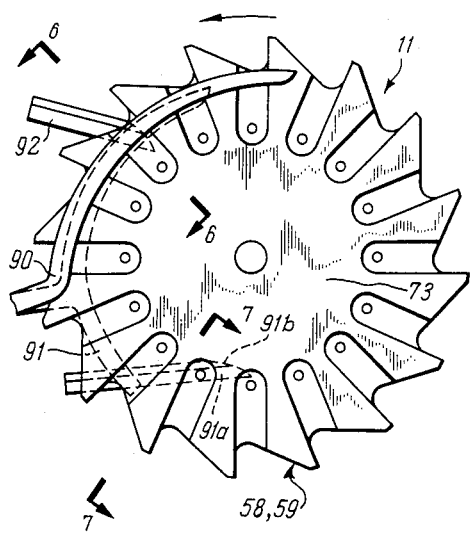
FIG. 5 is a side elevational view of the rotary carrier wheel, taken along lines 5—5 of FIG. 4, showing the guides and stationary cutting blades used to cut the wings apart.

As illustrated in FIG. 5, blade members 90, 91 and 92 are mounted in a stationary relationship with respect to each wheel half 58 and 59. The blade member 90 for each wheel half comprises a guide blade that is supported in abutting relationship to the inner surface 73 of each wheel half. Blade members 91 are each positioned in the annular groove 64 of each wheel half 58 and 59, and blade members 92 are each positioned in annular groove 66.

Wing cutters 12 and 13 each comprises a motor 94a and 94b, motor shaft 95a and 95b and rotary disc cutters 96a and 96b. The rotary disc cutters 96a and 96b are placed in alignment with the peripherial groove 63 between the wheel halves 58 and 59, so as to engage the oncoming bird 24 at the connecting joint between the carcass of each bird and its wings, so as to sever the wings from the carcass at their connecting joints to the carcass.

After the carcasses 24 pass the wing cutters 12 and 13, so that the wings have been severed from the carcass, the carcass is slidably mounted on the rectilinear rail 25 and carried away from the rotary carrier wheel 11. In the meantime, the wings 26 and 27 of the bird, having been previously spread laterally from the carcass of the bird and received in the recesses 68 of the wheel halves 58 and 59, continue to move with the rotary carrier wheel in a downward arc generally beneath the carcass carrier 14. As illustrated in FIG. 4, the limbs 100, 101 and 102 of each wing 26 and 27 of a bird 24 are placed so that the flipper limb 102 and intermediate limb 101 are received in the V-shaped slots 69 of a recess 68, and the drumette limb 100 extends from the apex 70 of the recess 68 to the carcass of the bird.

After the birds have been moved through the wing cutters 12 and 13 and the drumette limbs 100 have been severed from the carcass of the bird, guide blade 90 will engage and deflect the drumette limbs 100 downwardly (FIG. 6), so that the limbs 100 are received in the inwardly facing slots 71 of each wheel half 58 and 59. In the meantime, blade members 91 will engage the wings 26 and 27 at the joint between intermediate limbs 101 and flipper limbs 102, to urge these limbs partially down into the V-shaped slot 69 of the recesses 68. This tends to stabilize the wings 26 and 27, so as to bend the wings about the apex 70 of the recess 68.

Upon further movement of the rotary carrier wheel 11, the wings are carried to the blade members 92, which function as cutting blades. It will be noted in FIG. 5 that the blade members 92 reach into the annular grooves 66 of the wheel halves and cut outwardly through the joint between drumette limb 100 and intermediate limb 101. After the drumette limbs 100 pass the guide blade 90, they are free to fall from the wheel half downwardly to a collector (not shown).

As the rotary carrier wheel continues its rotation after the drumette limbs 100 have been cut from the wings 26 and 27 (FIG. 7), the blade member 91 of each wheel half urges the joint between the intermediate limb 101 and flipper limb 102 further downwardly into the V-shaped slot 69, and blade extension 91a, which is angled inwardly of the blade member 91 and has an inwardly facing cutting edge 91b, engages the joint between intermediate limb 101 and flipper limb 102 so as to sever the limbs apart at their connecting joint. Once the wings 26 and 27 pass the blade members 91, they are free to fall from the rotary carrier wheel 11. If necessary, a deflector blade (not shown) can ride in the annular groove 65 at the bottom of the rotary carrier wheel so as to eject any of the intermediate limbs 101 of the wings that have not fallen from the rotary carrier wheel after having been cut.

The invention provides the operator with the advantage of being able to place birds in the system and have the wings cut from the carcass and then have the wings cut apart in segments, as well as having the carcass removed. It is possible that the operator would elect to modify the equipment so as to change its function slightly. For example, either the breast cutter 42 or backbone cutters 49 or 50 could be eliminated from the system. Further, only one of the wing joints could be severed by eliminating one of the cutting blades from the wheel halves 58 and 59 of the rotary carrier wheel 11.

It should be understood that the foregoing description relates only to a prefered embodiment of the present invention, and that numerous modifications or alterations may be made therein without departing from the spirit and scope of the invention as set forth in the appended claims.

We claim:

1. A method of automatically cutting poultry carcasses and removing wings from the carcasses and cutting apart the wings comprising the steps of
    mounting each carcass at the peripheral portion of a wheel member with the wings stretched from the carcasses and supported by said wheel member,
    rotating said wheel member on a horizontal axis to move the carcasses in sequence about the wheel member,
    as each carcass moves with the wheel member cutting at the joints which connects the wings to the carcass with cutting members positioned about the wheel member to remove the wings from the carcass,
    after the wings have been cut from each carcass transferring the carcass from the wheel member to an elongated guide by mounting the visceral cavity of the carcass on the elongated guide and moving the carcass along the guide,
    cutting the carcass along the backbone and breast as the carcass is moved along the guide, and
    continuing the movement of the wings with the wheel member and cutting the wings at the joints of the wings with cutting members positioned about the wheel member to separate the wings into segments.

2. Apparatus for processing poultry comprising
    a wheel member mounting for rotational movement about a horizontal axis and defining a series of carcass support means spaced about the periphery of said wheel member for supporting poultry carcasses, and a plurality of wing support means spaced about the periphery of said wheel member and aligned with one another on opposite sides of each of said carcass support means and sized and shaped for receiving the wings of the carcasses mounted on said carcass support means with the wings extended out from the carcasses,
    motor means for rotating said wheel member about its horizontal axis,
    first cutting members arranged adjacent the path of said wheel member for cutting the wings away from each carcass as the wheel member moves each carcass in series past said first cutting members, and
    second cutting members arranged adjacent the path of said wheel member for cutting the wings at their joints as the wheel member moves the wings in series past said second cutting members.

3. The apparatus of claim 2 and wherein said wheel member further includes a plurality of carcass support mandrels mounted in said peripherial slot at equally spaced distances about said wheel member, said mandrels each including a neck support stem extending radially from said wheel member and a breast support stem extending at a right angle with respect to said neck support stem and extending from said neck support stem in the direction of rotation of said wheel member, whereby a poultry carcass is placed on a mandrel with the breast of the carcass engaging the breast support stem and the neck of the carcass engaging the neck support stem.

4. The apparatus of claim 2 and further including a carcass processor including a carcass transport rail extending approximately tangentially with respect to said wheel member for receiving the visceral cavity of the carcass, conveyor means for engaging each carcass and transporting each carcass along said rail, cutter means for cutting each carcass as each carcass is moved along said rail.

5. Apparatus for processing poultry comprising a wheel member mounted for rotational movement about a horizontal axis, said wheel member including a series of poultry carcass support means positioned at spaced intervals about its periphery for holding poultry carcasses in predetermined positions on said wheel, said wheel member further including means for holding the wings of the carcasses extended from the carcasses, motor means for rotating said wheel member, first cutting means positioned about the wheel member on opposite sides of the carcass support means and arranged to cut the wings from the carcasses as the carcasses move with the wheel member, and second cutting means positioned about the wheel member on opposite sides of the carcass support means and arranged to cut the wings at their joints so as to separate the wings into segments.

* * * * *